United States Patent [19]
Brown et al.

[11] Patent Number: 5,228,195
[45] Date of Patent: Jul. 20, 1993

[54] APPARATUS AND METHOD FOR A STATOR ASSEMBLY OF A ROTARY MACHINE

[75] Inventors: Allen W. Brown, East Hartford; Raymond A. Wolf, Broad Brook, both of Conn.

[73] Assignee: United Technologies Corporation, Hartford, Conn.

[21] Appl. No.: 887,117

[22] Filed: May 19, 1992

Related U.S. Application Data

[63] Continuation of Ser. No. 587,715, Sep. 25, 1990, abandoned.

[51] Int. Cl.⁵ ............................................. B23P 15/00
[52] U.S. Cl. .................................. 29/888.3; 29/890.01; 219/107; 228/181; 415/173.1; 415/173.5
[58] Field of Search .................. 29/888.3, 890.01; 277/53, 55, 57; 415/170.1, 173.1, 173.4, 174.4, 174.5, 173.5; 228/181; 219/91.2, 107, 117.1

[56] References Cited

U.S. PATENT DOCUMENTS

| 3,501,089 | 3/1970 | Alford | 415/174.4 X |
| 3,589,475 | 6/1971 | Alford | 415/174.5 X |
| 4,512,712 | 4/1985 | Baran, Jr. | 415/116 |

FOREIGN PATENT DOCUMENTS

| 0134186 | 5/1984 | European Pat. Off. |
| 0356305 | 8/1989 | European Pat. Off. |
| 1470032 | 1/1967 | France |
| 2144492 | 3/1985 | United Kingdom |

Primary Examiner—Joseph M. Gorski
Attorney, Agent, or Firm—Gene D. Fleischhauer

[57] ABSTRACT

A rotary machine which includes a stator assembly 36 having a seal assembly 38 is disclosed. Various structural details are developed which improve the structural integrity of the seal assembly during fabrication. In one detailed embodiment, the seal assembly includes a substrate 42 having angled surfaces 44, 46 facing a flowpath 24 for working medium gases which intersect at an obtuse angle region I and an axially continuous metal structure 48 which is attached to both surfaces and extends across the obtuse angle region.

7 Claims, 2 Drawing Sheets

APPARATUS AND METHOD FOR A STATOR ASSEMBLY OF A ROTARY MACHINE

This application is a continuation of U.S. application Ser. No. 07/587,715, filed on Sep. 25, 1990, and now abandoned.

TECHNICAL FIELD

This invention relates to a stator assembly for a rotary machine which bounds a flowpath for working medium gases extending through the machine. More particularly, this invention relates to a seal assembly in the stator assembly having honeycomb-like material adjacent to the flowpath and a method for making such a seal assembly. Although this invention was developed in the field of axial flow, rotary engines having a flowpath for working medium gases, the invention is applicable to any machine having a flowpath for hot gases.

BACKGROUND ART

An axial flow rotary machine, such as a gas turbine engine for an aircraft, is one example of a machine having a flowpath for hot gases which is bounded by seal structure. Such an engine typically includes a compression section, a combustion section and a turbine section. An annular flowpath for working medium gases extends axially through the sections of the engine. A stator assembly extends axially through the engine and circumferentially about the flowpath to bound the flowpath for working medium gases.

A rotor assembly extends axially through the engine. The rotor assembly has arrays of rotor blades in the turbine section. Each rotor blade extends outwardly across the working medium flowpath to receive work from the working medium gases and to drive the rotor assembly about its axis. In the compression section, the rotor assembly has compressor blades which extend radially outwardly across the medium flowpath. These blades are used to compress the incoming working medium gases.

The stator assembly includes arrays of seal assemblies disposed about the rotor assembly in the compression section and in the turbine section. Such seal assemblies might face radially outwardly or radially inwardly toward the working medium flow path. The seal assemblies block the leakage of working medium gases between the rotor assembly and the stator assembly, such as past the tips of the rotor blades, to preserve the efficiency of the engine.

Several factors affect the design of a seal assembly for the turbine section.

The seal assembly must tolerate the high temperatures of the turbine section and destructive interference with the tips of the turbine blades. Such interference may occur when inertia loads from aircraft maneuvers act on the rotor assembly. In addition, the method of making the seal assembly should avoid a high scrap rate and rework for the seal assemblies.

One typical seal assembly 40 used in the turbine section has a substrate 42 and a honeycomb-like metal structure 47 having an innermost surface 55 adjacent the array of rotor blades 28. The honeycomb-like metal structure is attached to the relatively rigid substrate. The substrate is typically formed of sheet metal or a forged ring which is disposed about the rotor blades and is segmented to accommodate thermal expansion and contraction of the stator assembly. The substrate in turn is supported from adjacent structure of the stator assembly to position the substrate and honeycomb-like metal structure radially with respect to the array of rotor blades.

An example of such a metal structure 47 is shown in FIG. 3 and is labeled prior art. The substrate 42 has an upstream end 49 and a downstream end 50 which adapt the substrate to engage the adjacent stator structure of the engine. The substrate has a reference axis $A_s$. A first surface 44 extends axially with respect to the axis $A_s$ and is a frustoconical arcuate segment in shape. A second surface 46 extends at an obtuse angle alpha to the first surface in a direction which is substantially parallel to the axis $A_s$. The second surface is a cylindrical segment in shape.

Two separate strips of honeycomb-like material are bonded to the substrate: one piece of honeycomb 47a is bonded to the frustoconical surface; the other piece of honeycomb 47b is bonded to the cylindrical surface.

Very few problems were encountered in attaching the cylindrically shaped portion of the honeycomb to the cylindrically shaped surface of the substrate. Many problems were encountered in attaching the frustoconically shaped piece of honeycomb to the frustoconically shaped surface of the seal assembly. In particular, delamination of the honeycomb material from the substrate would occur as shown in FIG. 3 at the region of the honeycomb that had the greatest radial height from the axis $A_s$. This delamination appeared in the finished article which was first welded and then bonded.

Fabrication of the part typically involved two steps. The first step was to weld the honeycomb to the substrate, such as by resistance welding although TIG tack welding might be employed. This required urging the honeycomb structure against the substrate to ensure that good contact occurred between the honeycomb structure and the substrate. Typically, special fixturing was employed to locate the honeycomb with respect to the substrate in the axial direction. After bonding, delamination of the honeycomb structure from the substrate was often found to have occurred on the frustoconically shaped surface.

Accordingly, scientists and engineers working under the direction of Applicants' Assignee have sought to solve the problem of delamination and to develop a method for bonding honeycomb to the frustoconically shaped surface that would reduce the rate at which delamination occurs during the manufacturing process and to reduce the need for special fixturing of the honeycomb.

DISCLOSURE OF INVENTION

This invention is predicated in part on the recognition that the radial force applied to the honeycomb structure to urge it into contact with the frustoconically shaped surface of the substrate requires excessively tight tolerances for an acceptable mismatch (that is less than four thousands of an inch (0.004 inches) between the substrate surface and the faying surface of the frustoconically shaped honeycomb. If the honeycomb is spaced further than the four thousandths of an inch for a substrate having a nominal radius of twenty to thirty (20-30) inches, an unacceptable level of force must be applied to the honeycomb to cause the honeycomb to conform to the frustoconical surface during the welding operation. Applying this level of radial force to the honeycomb may cause deformation of the rows of honeycomb cells near the downstream end of the honeycomb, that is, the honeycomb cells flare apart. This requires replacing the honeycomb structure so that satisfactory aerodynamic performance will result.

If the gap between the honeycomb and the substrate exceeds four thousandths of an inch (0.004 inches), applying additional force to conform the honeycomb to the substrate causes two other related problems. First, there is a tendency of the honeycomb to slide down the frustoconically shaped surface resulting in positioning problems. This requires additional fixturing. Use of the fixturing increased setup time required to accomplish the welding operation. Secondly, a portion of the honeycomb is in tension. This tension results from the large deflection of the radially high portion of the honeycomb needed to cause contact of the honeycomb with the substrate when applying the weld to the honeycomb. Accordingly, the radially high end of the honeycomb is under tension which tends to pull the honeycomb away from the substrate. The tensile stress is resisted by the strength of the weld holding the honeycomb in position. This weld would hold at room temperature and at normal engine operating temperatures.

Applicants found the weld under tension was a problem at the bonding temperature. Upon placing the substrate and honeycomb in the bonding furnace, and heating the honeycomb to the required temperature for the bonding process, the weld weakened allowing the honeycomb to pull away from the substrate and preventing the bonding material from extending between the honeycomb material and the substrate. This resulted in a significantly high scrap rate for the seal assemblies made by this process.

According to the present invention, a method for making a seal assembly for a rotary machine which has a substrate having two surfaces which face the flowpath and which extend in the axial direction at an obtuse angle to each other, includes the steps of: forming an integral honeycomb-like metal structure having a shape which generally conforms to the contours of both surfaces and having a length that places the ends of the honeycomb-like metal structure on either side of the obtuse angle; welding the honeycomb-like metal structure to the surfaces on either side of the obtuse angle to hold the metal structure in position during the bonding step; and, bonding the metal structure to the surface with a suitable bonding technique.

In accordance with the present invention, a seal assembly for a machine has a substrate having an axis of symmetry and two surfaces facing the axis which extend axially one to the other at an obtuse angle; and, the seal assembly has a layer of integral honeycomb-like metal structure extending across the angle which is bonded to the substrate first surface on one side of the obtuse angle region and bonded to the substrate second surface on the other side of the obtuse angle region.

In accordance with one detailed embodiment of the present invention, the second surface is substantially parallel to the axis of the seal assembly, and the face of the honeycomb-like metal structure is substantially parallel to the substrate second surface and is spaced apart from the first and second surfaces in the obtuse angle region of the seal member.

A primary feature of the present invention is an arcuate substrate having a frustoconically shaped surface and a cylindrically shaped surface. The surfaces are oriented with respect to each other at an obtuse angle. The surfaces meet at an obtuse angle region having a fillet radius extending between the surfaces. Another feature is an integral (one-piece) honeycomb-like metal structure which is attached as one-piece to the cylindrically shaped surface and to the frustoconically shaped surface of the arcuate substrate. The metal structure is an integral structure because it is axially continuous, that is, the pieces of the structure are axially attached one to the other. In one embodiment, a feature is a radial gap $G_r$ which spaces the honeycomb-like seal structure from the substrate. Still another feature is the length of the honeycomb-like metal structure on either side of the obtuse angle region which is bonded to the substrate. In one detailed construction, weld material and bond material are found at many locations adjacent to the obtuse angle region of the substrate on both the first and second surface.

A primary step of the method of making the seal assembly is forming the seal assembly by attaching an integral honeycomb-like metal structure to the substrate to both surfaces of the substrate. Again, the term "integral" refers to a honeycomb-like metal structure formed as one-piece or so joined as to be free standing as one-piece in the uninstalled condition. Such a metal structure is axially continuous. The method includes the steps of welding the honeycomb-like metal structure to the substrate to hold the metal structure in place against the substrate and then bonding the metal structure to the substrate. Another feature during the step of welding the honeycomb-like metal structure to the substrate, is the cylindrically shaped surface of the substrate which aids in supporting and positioning the honeycomb-like metal material on the substrate. After the welding operation, another feature during the step of bonding is the weld between the cylindrically shaped portion of the honeycomb-like metal structure and the substrate which restrains the tensioned portion of the frustoconically shaped section of the honeycomb-like metal structure from pulling away from the substrate. Still another feature in one detailed method includes the step of removing a portion of the honeycomb-like metal structure adjacent the obtuse angle region of the substrate to avoid interference between the fillet of the obtuse angle region and the honeycomb-like structure.

A primary advantage of the present invention is the simplicity and ease of fabrication of a seal assembly and its structural integrity which results from using a single piece of honeycomb-like metal structure of the present invention with a substrate having an obtuse angle. The honeycomb-like metal structure 1) spans the obtuse angle region and 2) uses a surface of the substrate which is substantially parallel to the innermost surface of the honeycomb-like metal structure to position and hold the non-parallel portion of the honeycomb during and after the welding operation. Another advantage is the size of the tolerances permitted which results from the strength of the weld between the parallel surfaced honeycomb-like structure and substrate enabling a level of mismatch between the non-parallel surfaced honeycomb and substrate. Finally, an advantage is the overall engine weight which results from attaching honeycomb to a frustoconically shaped surface and a cylindrically shaped surface as opposed to constructions in which the substrate is formed so that the entire surface of the substrate is parallel to the innermost surface of the honeycomb-like structure.

The foregoing features and advantages of the present invention will become more apparent in light of the following detailed description of the best mode for carrying out the invention and the accompanying drawings.

BEST MODE FOR CARRYING OUT THE INVENTION

Figure 1:
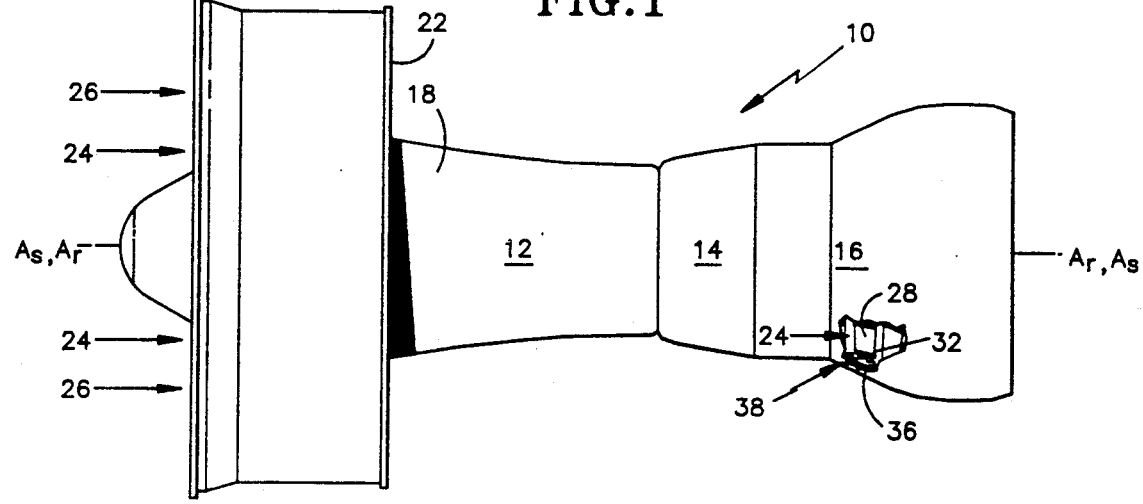
FIG. 1 is a side elevation view of an axial flow rotary machine with the stator assembly partially broken away to show a portion of a flowpath for working medium gases, of a rotor assembly, and of an array of seal assemblies circumscribing the rotor assembly.

FIG. 1 is a side elevation view of an axial flow gas turbine engine 10 of the turbofan type. The engine has an axis of rotation $A_r$. A compression section 12, a combustion section 14 and a turbine section 16 are disposed circumferentially about the axis $A_r$. The compression section includes a compressor 18 and a turbofan 22. A primary flowpath 24 for working medium gases extends circumferentially about the axis A and rearwardly through the sections of the engine. A secondary flowpath 26 for working medium gases extends rearwardly through the engine outwardly of the primary flowpath.

A rotor assembly in the turbine section of the engine includes a rotor disk and a plurality of rotor blades, as represented by the single rotor blade 28, which extend radially outwardly across the working medium flowpath 24. The rotor assembly extends to the compression section 12 to drive the compressor 18 and the fan 22.

Each rotor blade has a tip 32 having a plurality of knife edge projections 34. The knife edge projections extend radially outwardly from the rotor blade. The knife edge projections block the flow of working medium gases 24 around the tip of the rotor blade as the gases pass through the rotor assembly to drive the rotor assembly about its axis of rotation $A_r$.

A stator assembly 36 extends axially through the engine to bound the flowpath working medium gases 24. The stator assembly has bearings (not shown) which rotatably support the rotor assembly about the axis of rotation $A_r$. The stator assembly includes an array of seal assemblies, as represented by the seal assembly 38, which extends circumferentially about the rotor blades in close radial proximity to the knife edges 34 of the rotor blades.

Figure 2:
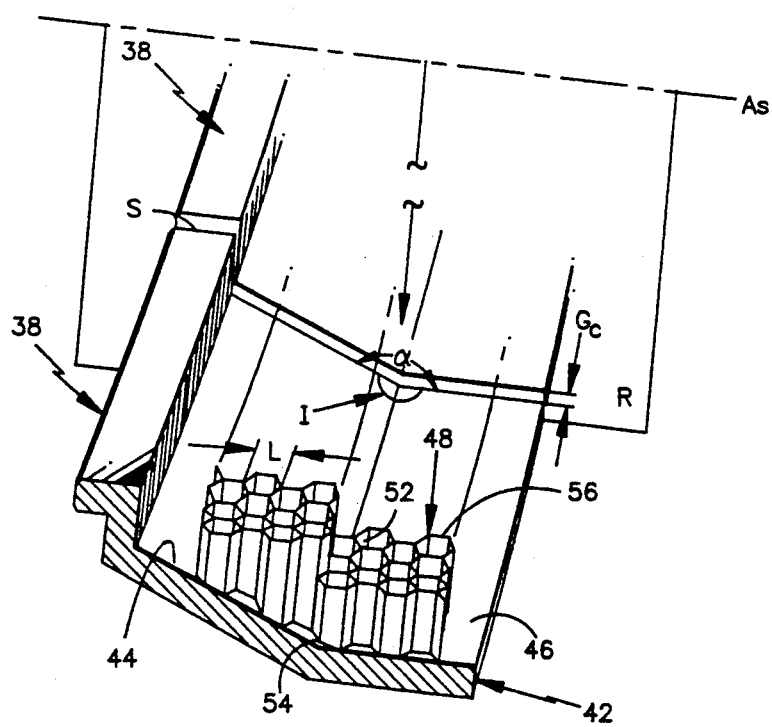
FIG. 2 is an enlarged partial perspective view of a portion of the seal assembly shown in FIG. 1.
Figure 3:
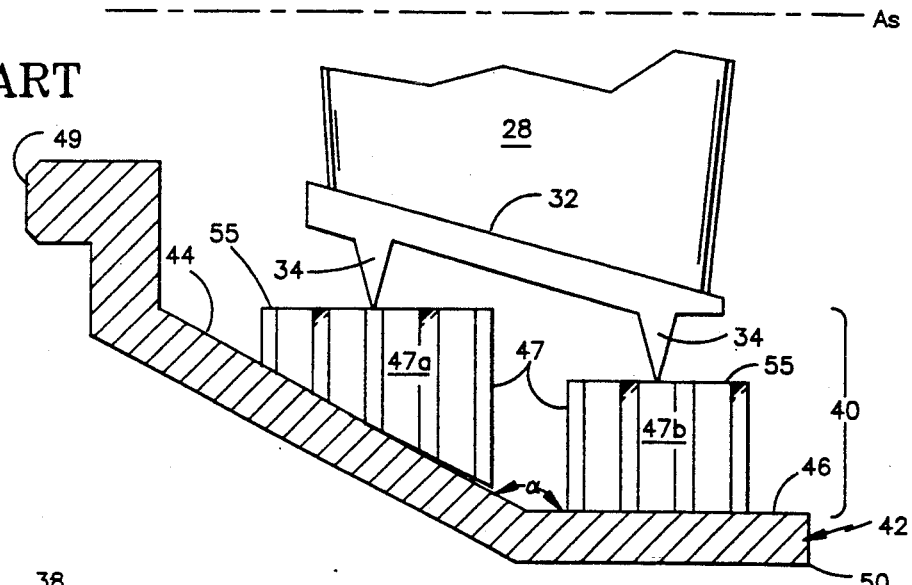
FIG. 3 is an enlarged schematic cross-sectional view of a portion of an array of seal assemblies of the prior art.

As shown in FIG. 2, the array of seal assemblies 38 includes a plurality of substrates, as represented by the substrate 42. Each substrate extends circumferentially with respect to an axis $A_s$. In the embodiment shown, the axis $A_s$ is coincident with the axis of rotation $A_r$.

Each substrate 42 is spaced circumferentially from the adjacent substrate leaving a circumferential gap $G_c$ therebetween. Each substrate has a first frustoconically shaped surface 44 and a second, substantially cylindrically shaped surface 46 facing the working medium flowpath. Each radial plane containing the axis $A_s$, as represented by the plane R, extends radially and axially to intersect the surface of the substrate at the line S. The radial plane also extends through the axis of rotation $A_r$ and $A_s$. The line S at the second surface which is cylindrically shaped is substantially parallel to the axes $A_r$, $A_s$. The line S and the cylindrically shaped surface are considered substantially parallel to the axes $A_r$, $A_s$ if the angle beta of the line s of the surface 56 extends in the radial plane R at an angle of ten (10) degrees or less with respect to the axis $A_s$. Preferably, the angle will be about five (5) degrees or less.

The second surface 46 of the substrate 42 intersects the first surface 44 of the substrate at an obtuse angle region I. The angle alpha between the first frustoconically shaped surface and the second substantially cylindrically shaped surface is an obtuse angle, that is less than 180 degrees but larger than 90 degrees. Typically, the angle will be about 135 degrees to about 160 degrees.

An integral honeycomb-like metal structure 48 is attached to the first and second surfaces 44, 46 of the substrate. The term "honeycomb-like metal structure" includes any structure formed of metal material having a multiplicity of edges which contact the surfaces of the substrate and having a plurality of cavities to trap and block the passage of working medium gases past the face of the structure. The structure may be formed of the strips of metal material being joined together to form a lightweight structure or the like. In the particular embodiment shown, the integral honeycomb-like metal structure is honeycomb material of the type commonly used in gas turbine engines which is commonly referred to as honeycomb. The honeycomb is formed of strips of metal bonded together to form hexagonal cells 52. Each cell has an axial length L.

The honeycomb has an outermost surface 54 which conforms to the substrate and an innermost surface 56 facing the axis $A_s$. The innermost surface is substantially parallel to the second surface 46 of the substrate, that is, lines in the radial plane R on the surfaces intersect at an angle beta less than ten (10) degrees and preferably less than five (5) degrees. As will be realized, the innermost surface may have a stepped contour which is machined after fabrication into the surface of the honeycomb. For aerodynamic and structural reasons, the honeycomb cells extend radially.

The honeycomb structure 48 extends over the obtuse angle region I of the substrate 42 and between the first surface 44 and the second surface 46. The attachment of the outermost surface of the integral honeycomb structure to the second surface holds the honeycomb structure in place on the second surface and aids in holding it in place on the first surface adjacent to the obtuse angle region of the honeycomb.

Figure 4:
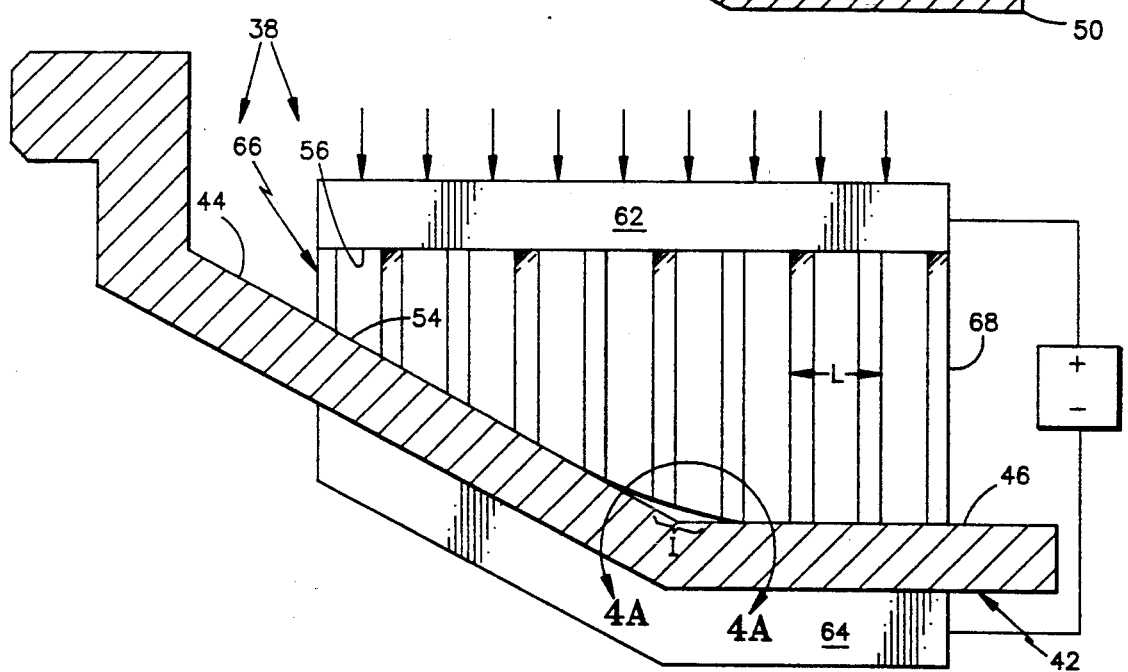
FIG. 4 is a schematic view of the seal assembly shown in FIG. 2 showing the relationship of the seal assembly to a welding electrode and grounding element during fabrication of the seal assembly.

FIG. 4 is a schematic representational view of the seal assembly 38 of FIG. 2 during fabrication of the seal assembly. FIG. 4 shows the relationship of the honeycomb structure 48 to the substrate 42 and the relationship of the seal assembly as a whole to a welding electrode 62 and grounding material 64. As will appear below, the honeycomb cells are both welded and bonded, such as by brazing, to the first surface 44 and to the second surface 46.

The method of forming the seal assembly includes forming the substrate 42 with the angled surfaces 44, 46 as described in FIG. 2. This may be done by forging or machining a ring. Alternatively, the substrate may be formed of sheet metal strips which are attached to each other. In either case, the substrate has a first surface 44 which extends axially with respect to the axis $A_s$ and a second surface 46 at an obtuse angle to the first surface as described earlier.

The integral honeycomb-like metal structure 48 is formed to have an innermost fabrication surface 56 which is substantially parallel to the second surface 46. The surfaces are substantially parallel if the radial plane R forms lines of intersection with the innermost surface and the second surface such that the surfaces are at an angle beta of ten (10) degrees or less and preferably in the range of less than five (5) degrees. The integral honeycomb structure has an outermost surface 54 which generally conforms to the first surface 44 and to the second surface 46 of the substrate 42. The integral structure is in one-piece or acts as one piece such that attaching the integral structure at one location necessarily restrains the remainder of the structure against axial movement at a second location.

After forming the integral honeycomb metal structure, the electrode 62 is disposed against the innermost surface 56 and the grounding material 64 is disposed against the substrate 42. The electrode exerts a force on the integral honeycomb structure 48 urging the honeycomb structure against the substrate. The outermost surface of the honeycomb structure conforms to the first and second surfaces locating the structure in the axial direction. The urging force acts nearly normal (perpendicular) to the second, substantially cylindrical surface 46 and at an angle to the frustoconically shaped surface 44. The conical angle of the surface 44 causes the substrate to exert a radial component of force and an axial component of force on the honeycomb. This provides good electrical contact with both surfaces, but may cause some local deflection of the honeycomb on the conical surface. For example, if the upstream end 66 and downstream end 68 of the honeycomb structure 48 protrude radially, even slightly, the axial center is deflected inwardly by the radial component of force of the electrode. This causes radial tension in the honeycomb because the deflected honeycomb is attached to the substrate.

The resultant force component from the substrate also acts in the axial direction on the honeycomb and causes a local axial deflection of the honeycomb. This deflection is more significant adjacent the obtuse angle region of the substrate because of the greater radial height of the honeycomb at this location. The axial component of force also urges the honeycomb structure down the frustoconical surface. However, the frictional force resulting from the normal force and the sliding coefficient of friction at the points between the cylindrically shaped surface of the substrate and the honeycomb resists such movement, positively locating the honeycomb although the honeycomb on the frustoconical surfaces may be deflected slightly toward the surface of the substrate.

After the integral honeycomb structure contacts the substrate, an electrical current is passed through the honeycomb and the substrate to resistance weld the honeycomb structure at a plurality of locations to the substrate.

Figure 4A:
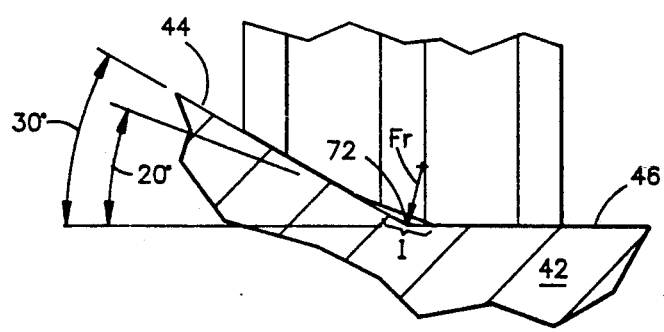
FIG. 4a is an enlarged view of a portion of FIG. 4.

As shown in FIG. 4a, which is an enlarged view of a portion of FIG. 4, the substrate 42 in the obtuse angle region I has a fillet having a radius $F_r$. The fillet 72 provides a smooth transition between the first surface 44 and the second surface 46. However, it is possible for the cylindrically shaped honeycomb to ride up the fillet during assembly. This spaces the honeycomb away from the cylindrically shaped substrate surface or causes a larger deflection of the honeycomb in the radial direction if the honeycomb is forced into contact with the cylindrical surface. Accordingly, the honeycomb structure is slightly cut away in the region radially adjacent to the obtuse angle region I. This promotes locating the honeycomb structure on the substrate and avoids the honeycomb structure riding up the fillet.

By reason of the good contact between the cylindrically shaped surface and the contact between the honeycomb of the frustoconical surface, the electrical current causes welding at a plurality of locations on the second surface 46 including a region adjacent to the obtuse angle region and at a plurality of locations on the first surface 44 including a region adjacent to the obtuse angle region. These welds are important during the bonding process.

Tungsten inert gas welding (TIG welding) might be used instead of resistance welding with a large flat electrode. Preferably, the cylindrically shaped downstream portion of the honeycomb is tack welded first, securing the cylindrically shaped portion of the honeycomb structure to the substrate and locating the honeycomb structure with respect to the substrate. The force applied to the cylindrically shaped surface is normal to both the honeycomb surface and the substrate surface allowing for increased pressure to be applied to take up any mismatch which might occur without flaring of the first few rows of cells. Thereafter, the frustoconically shaped portion is tack welded by the TIG process. It is then possible to apply a greater amount of pressure to the honeycomb structure of the present invention in comparison to the pure frustoconically shaped honeycomb of the prior art. This allows taking up more mismatch in the frustoconically shaped portion of the honeycomb without encountering the problems associated with the pure conical honeycomb, such as the first few rows of honeycomb cells tending to flare up and sliding problems. This is prevented by the initial tack welds of the cylindrical portion which hold the integral honeycomb in place reducing sliding and flaring of the endmost cells.

Thereafter, the seal assembly 38 of the substrate 42 and integral honeycomb structure 48 is disposed in a bonding furnace. The bonding furnace is provided with a non-oxidizing environment, such as a vacuum or inert gas atmosphere of argon, hydrogen or a combination of argon and hydrogen. Bonding material, such as AMS (Aerospace Material Specification) 4777 braze material is disposed in powder, paste or tape form adjacent to the interface between the outermost surface 54 of the honeycomb 48 and the first and second surfaces 44, 46 of the substrate.

The seal assembly 38, with the welds holding the honeycomb structure in close proximity to or against the substrate, is heated to a temperature of about one-thousand nine hundred and fifty degrees (1950°) Fahrenheit to cause melting and adherence of the bond material to the substrate 42 and the integral honeycomb structure 48. At this point in the process, the welds perform their critical function of holding the honeycomb in place. The welds prevent delamination of the honeycomb, resisting the tensile stresses in the honeycomb which result from tolerances and deflection of the honeycomb on the frustoconically shaped surface of the substrate. The welds on the cylindrically shaped surface are strong, experience less tensile stresses and aid the welds on the frustoconically shaped surface in holding against tensile stresses in the honeycomb that result from tolerances. This is important because the elevated temperatures of the bonding process decrease the strength of the welds of both surfaces; and these tensile stresses in combination with thermal stresses resulting from the bonding process may exceed the strength of the welds on the conical surfaces.

Thus, the welds adjacent to the obtuse angle region I on the first surface 44 of the substrate 42 and on the second surface 46 of the substrate hold the integral metal structure 48 and the substrate together without delamination of the integral metal structure from the substrate during the bonding step.

Figure 5:
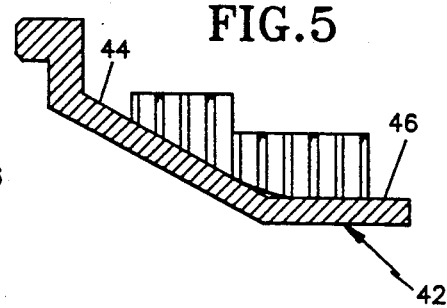
FIG. 5 is a schematic view of the seal assembly shown in FIG. 4 after completion of the machining of the surface of the honeycomb-like metal structure.

After the bonding step is completed, the assembly is cooled and is ready for use in the engine or for further processing. The further processing might include removing a portion of the honeycomb as shown in FIG. 5 to form a seal having a radial step.

This method of making the seal assembly 38 might employ a substrate 42 which is formed as a complete ring. An integral honeycomb structure is then also formed as a ring and inserted within the ring of the substrate. After bonding, the rings of the seal assembly are cut axially at circumferentially spaced locations to form a plurality of circumferentially extending seal assemblies. Alternatively, each substrate may be formed as an arcuate portion and an arcuate piece of honeycomb bonded to the substrate.

Both methods of assembly use or employ 1) a cylindrically shaped surface in combination with a frustoconically shaped surface; and, 2) honeycomb that extends between both surfaces. This simplifies the seal assembly which is made with two parts instead of three and makes fabrication easier. Increased structural integrity results from using a single piece of honeycomb 48 bonded to a substrate 42, the honeycomb having a face 56 which is substantially parallel to the substrate surface and cells which are substantially perpendicular to the substrate surface. This causes a normal force to be exerted on the cylindrically shaped substrate surface which acts as a locating force and avoids both flaring of the cells and sliding movement of the honeycomb. The welds on the cylindrically shaped surface resist small or negligible assembly stresses in the honeycomb as compared to the frustoconically shaped surface. As a result, the welds are more durable in the bonding furnace. This permits the use of larger tolerances in forming the honeycomb structure, further increasing the simplicity and ease of fabrication, while reducing the loss of parts to fabrication errors and delamination.

The substrate 42 of the present invention has decreased weight and a concomitant benefit in engine efficiency, especially in comparison to structures which employ cylindrical surfaces only, and seek to avoid the frustoconical surfaces to reduce fabrication problems.

Although the invention has been shown and described with respect to detailed embodiments thereof, it should be understood by those skilled in the art that various changes in form and detail thereof may be made without departing from the spirit and scope of the invention. As will be realized, honeycomb-like material includes any material formed of strips of metal oriented and joined together to form a light weight structure having cavities to trap and block passage of gases. The honeycomb might be formed initially so that the innermost surface of the honeycomb is stepped. In any event, the innermost surface adjacent to the second cylindrically shaped surface of the substrate is substantially parallel to this surface of the substrate. Such a configuration might be TIG welded or might use a resistance welding electrode. If using a resistance welding electrode, the welding is accomplished in two passes, preferably first welding the innermost surface which is axially aligned with the cylindrically shaped second surface of the substrate and then resistance welding the innermost surface axially aligned with the frustoconically shaped surface of the substrate.

Using one electrode to engage an innermost surface having a surface at the same engine radius, provides for a one pass resistance welding operation, although it requires machining the honeycomb in a later step for a stepped configuration.

As will be realized, the honeycomb material is bonded to the substrate adjacent the obtuse angle region with both welding and brazing material. This provides a particular good bond in this critical location.

It should be understood that the invention is not limited to the particular embodiments shown and described herein, but that various changes and modifications may be made without departing from the spirit and scope of this novel concept as defined by the following claims.

What is claimed is:

1. A method of forming a seal assembly for a rotary machine having a substrate which is disposed about an axis $A_S$, the substrate having a reference plane R which extends radially from the axis $A_S$ and contains the axis, a first surface which extends axially with respect to the axis and a second surface at an obtuse angle to the first surface in the reference plane R, the substrate further having an intersection where the surfaces intersect, and an obtuse angle region at the intersection of the first surface and the second surface, comprising:

forming an integral honeycomb-like metal structure which is axially continuous and which has an innermost surface which is substantially parallel to the second surface of the substrate and an outermost surface which generally conforms to the first surface and the second surface of the substrate;

urging the integral honeycomb-like metal structure against the substrate, thereby locating the integral metal structure on the substrate in a position in which the outermost surface of the metal structure contacts the first surface and the second surface of the substrate and extends over the obtuse angle region of the substrate;

passing an electrical current through the integral metal structure and the substrate, thereby welding the integral metal structure while in said position to the substrate at a plurality of locations on the first surface including a region adjacent to the obtuse angle region and at a plurality of locations on the second surface including a region adjacent to the obtuse angle region;

bonding the integral metal structure to the substrate with bonding medium which is disposed adjacent the interface between the integral metal structure and the substrate by heating the seal assembly to an elevated temperature such that the bonding medium adheres to the substrate and the integral metal structure;

cooling the seal assembly, wherein the welds adjacent the obtuse angle region on the first surface and on the second surface hold the integral metal structure and the substrate together without delamination of the integral metal structure from the substrate during the bonding step with the welds on the second surface adjacent to the obtuse angle region aiding the welds on the first surface in holding the integral metal structure in place.

2. The method of forming a seal assembly of claim 1 wherein the bonding medium is a braze material.

3. The method of forming a seal assembly of claim 1 wherein during the step of urging the integral metal structure against the substrate, an electrode is pressed against the integral metal structure urging the outermost surface of the integral metal structure against the first surface and against the second surface and the step of passing the electrical current includes flowing electrical current from the electrode through the integral metal structure to the substrate.

4. The method of forming a seal assembly of claim 3 wherein the second surface of the substrate is substantially parallel to the axis $A_s$.

5. The method of forming a seal assembly of claim 1 wherein the step of forming the integral metal structure includes the step of removing a portion of the outermost surface adjacent the obtuse angle region such that the obtuse angle region of the substrate is spaced from the integral metal structure during the step of locating the integral metal structure on the substrate, thus preventing interference between integral metal structure and the obtuse angle region of the substrate.

6. The method of making the seal assembly of claim 1 wherein the substrate is formed as a ring, the integral honeycomb-like metal structure is formed as a ring and the method includes, after the step of cooling, a step of cutting the ring, axially at circumferentially spaced locations thereby forming the seal assembly as a plurality of circumferentially extending seal assemblies.

7. The method of making the seal assembly of claim 6 wherein the innermost surface has the same diameter from the axis $A_s$ after the step of bonding and wherein the method includes the step of machining a portion of the integral metal structure away, thereby forming an innermost surface having a first region and a region axially adjacent to the first region, the first region having a different diameter with respect to the axis $A_s$ than the region axially adjacent to the first region of the seal assembly.

* * * * *